May 18, 1965  D. L. BRACKETT  3,184,109
FEEDING SYSTEM
Filed May 3, 1963  3 Sheets-Sheet 1
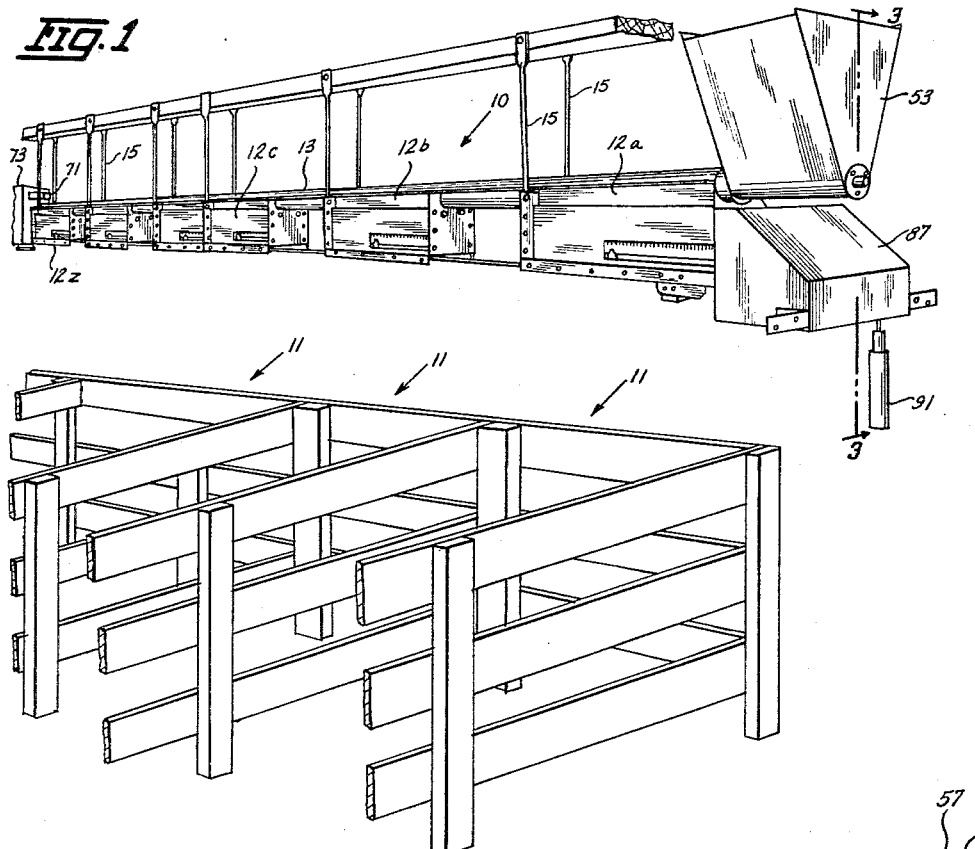
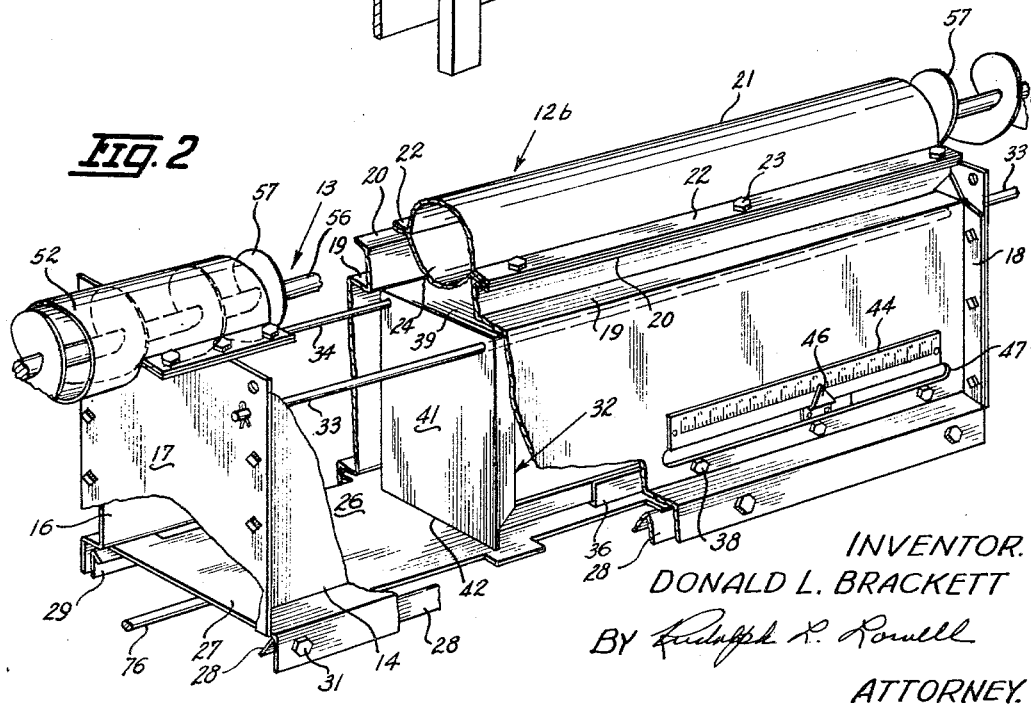
INVENTOR.
DONALD L. BRACKETT
BY *[signature]*
ATTORNEY.

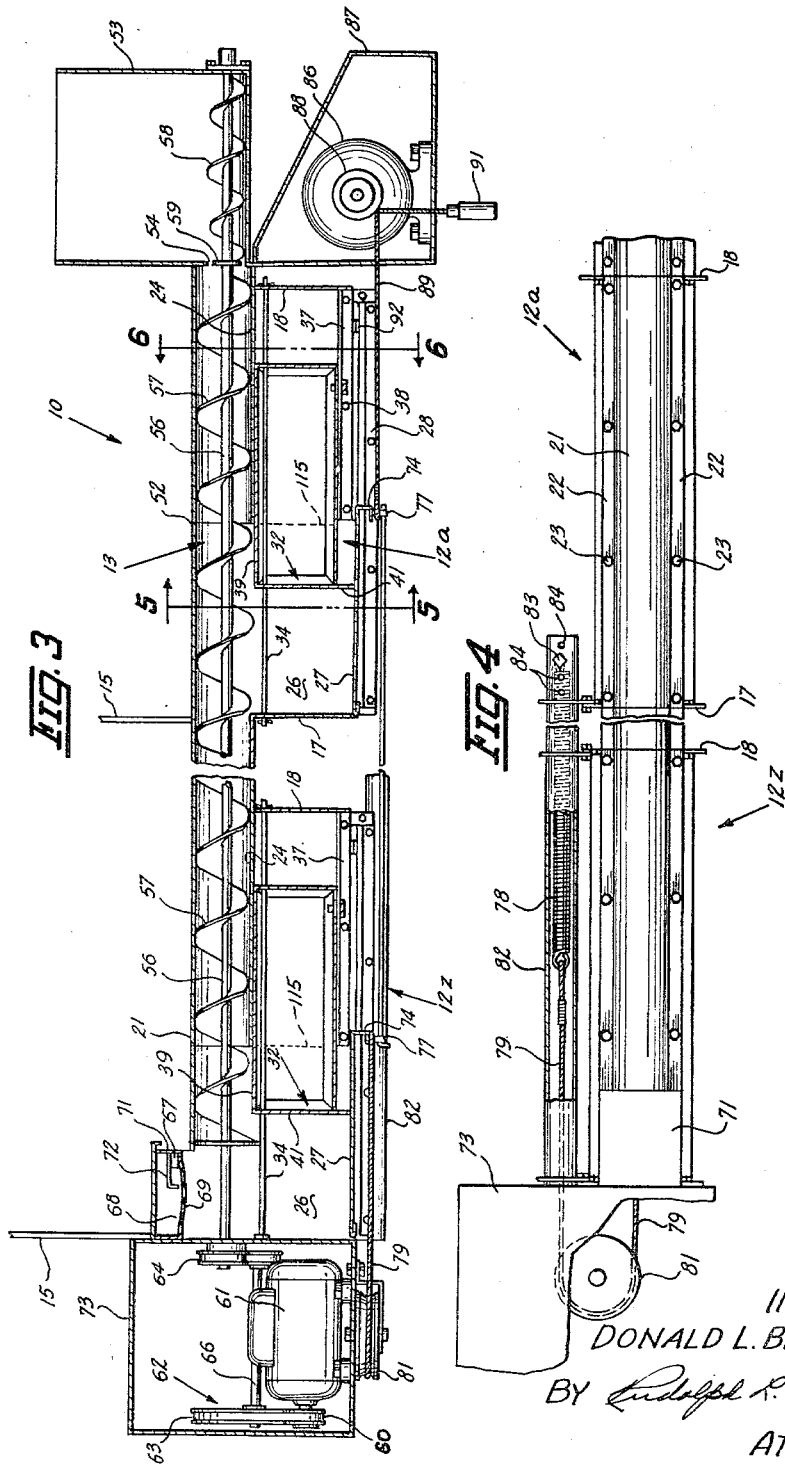

May 18, 1965
D. L. BRACKETT
3,184,109
FEEDING SYSTEM
Filed May 3, 1963
3 Sheets-Sheet 3
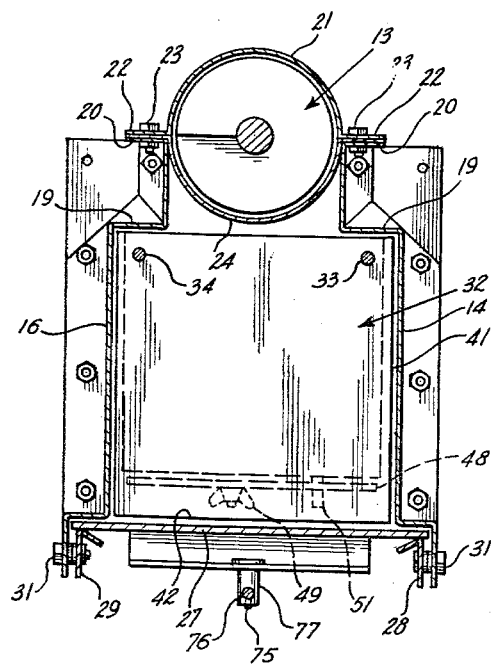
INVENTOR.
DONALD L. BRACKETT
BY Rudolph L. Lowell
ATTORNEY.

United States Patent Office 3,184,109
Patented May 18, 1965

3,184,109
FEEDING SYSTEM
Donald L. Brackett, Oskaloosa, Iowa, assignor to Mahaska Industries, Inc., Oskaloosa, Iowa, a corporation of Iowa
Filed May 3, 1963, Ser. No. 277,801
10 Claims. (Cl. 222—64)

This invention relates to a feeding system for automatically dispensing a predetermined amount of bulk material at a desired location. More particularly, the invention pertains to an apparatus used to simultaneously supply feed to separate groups of livestock, such as hogs, cattle, or poultry, at predetermined times and in measured amounts.

It is the object of the invention to provide an improved feeding apparatus having a plurality of feed metering and dispensing units connected with a common conveyor operable to carry feed to each unit whereby at selected times a predetermined measured amount of feed is simultaneously discharged from the units.

Another object of the invention is to provide in a feeding system, a feed dispensing unit which is adjustable to supply a predetermined amount of feed and operable to discharge the feed at selected times to a plurality of feed stations so that each station of the feeding system is individually adjustable to discharge a specific amount of feed.

A further object of the invention is to provide a feeding system capable of conveying and simultaneously discharging blended bulk feeds in predetermined amounts at a plurality of feed stations without separating the ingredients of the feed.

An additional object of the invention is to provide a dependable and economical feeding system which is versatile in installation and application for delivering an accurate amount of feed to each of a plurality of feeding stations.

Further objects and the exact nature of the invention will appear from the consideration of the following description taken in conjunction with the accompanying drawings, in which:

FIG. 1 is a perspective view of the feeding system of this invention;

FIG. 2 is a perspective view with parts broken away of the measuring and dispensing unit of this invention;

FIG. 3 is an enlarged foreshortened sectional view taken along the line 3—3 of FIG. 1;

FIG. 4 is a plan view of the last two dispensing units of the feeding system;

FIG. 5 is an enlarged sectional view taken along the line 5—5 of FIG. 3;

FIG. 6 is an enlarged sectional view taken along the line 6—6 of FIG. 3; and

FIG. 7 is an electrical circuit diagram of the feeding system of FIG. 1.

Referring to the drawing, there is shown in FIG. 1 the feeding system of this invention, indicated generally by the numeral 10 in an operating relation with a series of separate feeding pens or stations 11. The feeding system 10 is shown as applied to a confined and limited hog feeding program wherein predetermined amounts of feed are periodically dropped on the floor of the respective pens 11.

A predetermined amount of bulk feed is discharged into each of the pens 11 by a plurality of separate feed metering and dispensing units 12a to 12z supported above the pens 11 by means of metal straps 15 secured to the ceiling of a structure. The units 12a to 12z are connected in series with a common rotary conveyer 13 and correspond in number to the pens 11. The size of the feeding system may vary from a single unit 12a to any number of successive units indicated as 12a to 12z.

Referring to FIG. 2, there is illustrated a metering and dispensing unit 12b which is substantially identical with the remaining metering and dispensing units of the feeding system with the exception of the last unit 12z. The unit 12b has opposite parallel side walls 14 and 16 secured at their corresponding ends to flat transverse end plates 17 and 18. The top of each side wall 14 and 16 has an inwardly stepped section 19 which terminates in an outwardly projected flange 20. The slide walls 14 and 16 and end plates 17 and 18 define a rectangular-shaped box the top of which is closed by a semicylindrical member 21 having lateral flanges 22 which are positioned over the flanges 20. Bolt and nut assemblies 23 extend through the flanges 20 and 22 and secure the member 21 to the top side of the walls 14 and 16.

An upwardly open semicylindrical member 24 is positioned below the cylindrical member 21 and forms therewith a tubular casing through which the rotary conveyer 13 extends. The cylindrical member 24 extends from the end plate 18 and terminates substantially midway between the end plates 17 and 18 thereby forming an opening below the rotary conveyer 13 into a box shaped area 26 defined by the side walls 14 and 16 and the end plate 17. The ratio of the dimensions of width and depth of the area 26 is substantially equal to minimize packing of feed in the chamber.

The bulk feed is retained in the area 26 by a slidable bottom door 27 which extends between the side walls 14 and 16 and is supported thereon by angle members 28 and 29. Bolt and nut assemblies 31 secure the angle members 28 and 29 to the longitudinal lower edge of the side walls 14 and 16. The door 27 extends longitudinally of the unit 12b and is movable toward and away from the end plate 17 to close and open the area 26.

In order to adjust the volume of the area 26 a rectangular-shaped partition 32 is adjustably mounted within the box formed by the side walls 14 and 16. The area 26 defined by the side walls 14 and 16, the door 27 and the partition 32 constitutes an expansible and contractable feed metering chamber or variable volume feed chamber. A pair of longitudinally extended rods 33 and 34 are retained in the upper section of the end plates 17 and 18 and extend through the partition 32. As shown in FIG. 6, the bottom edge of the partition 32 rests on angle members 36 and 37 which are fastened to the side walls 14 and 16 by nut and bolt assemblies 38. The partition 32 has a substantially flat top wall 39 which lies closely adjacent the semicylindrical member 24 and the inwardly stepped sections 19 of the side walls 14 and 16, respectively. The top wall 39 joins an upright wall or bulkhead 41 which has a bottom edge 42 terminating closely adjacent the top surface of the door 27 (FIG. 5). The partition 32 is slidable along the rods 33 and 34 to move the upright wall or bulkhead 43 toward the end plate 17. The longitudinal space between the end plate 17 and the upright wall 41 is calibrated by means of a scale 44 having indicia mounted on the side wall 14. A pointer 46 is fastened to the partition 32 and extends through a longitudinal slot 47 in the side wall 14 adjacent the scale 44. The calibration on the scale is a function of the weight of a specific volume of feed.

As best shown in FIG. 6, the partition 32 is releasably clamped to the angle members 36 and 37 by means of a flat bar 48 extended transversely between the side walls 14 and 16 and engageable at each end thereof with the bottom surface of the angle members 36 and 37. A nut and bolt assembly 49 releasably connects the bar 48 with the partition 32. A guide pin 51 extending downwardly from the partition 32 through the bar 48 maintains the bar transversely of the unit.

Referring to FIG. 3, the separate metering and dispensing units 12a to 12z are connected with each other by means of cylindrical tubes 52 which form a housing for the rotary conveyer 13. Immediately adjacent the first unit 12a is a feed hopper 53 which has an opening 54 adjacent the bottom wall which leads into the tubular casing formed by the semicylindrical members 21 and 24 of the first unit 12. The rotary conveyer 13 comprises an auger assembly 56 having a first continuous spiral flight 57 extended longitudinally through the tubular casing formed by the semicylindrical members 21 and 24 and the connecting cylindrical tube 52. The auger assembly 56 has a second continuous spiral flight 58 in the feed hopper 53 of a diameter smaller than the flight 57 so that the volume of feed moved into the path of the moving spiral flight 57 is always under the capacity of the first spiral flight carrying the bulk feed to the respective units. In order to reduce the flow of bulk feed from the hopper 53 into the spiral flight 57 a circular disc 59 is positioned between the flights 57 and 58 in the opening 54. The disc 59 restricts the opening 54 to an annular passage which has a maximum flow capacity less than the feeding capacity of the spiral flights 58. The excess bulk feed is moved upwardly in the hopper 53 and produces a back flow of bulk material in the hopper 53.

The auger assembly 56 is rotatably driven by an electric motor 61 mounted adjacent the last unit 12. A power transmitting mechanism 62 comprising a pair of belt pulley assemblies 60 and 63 connected by a jack shaft 66 drivably connects the motor 61 with the auger assembly 56.

The last dispensing unit 12z, as shown in FIG. 3, has a control micro-switch 67 which is operated in response to the pressure of the bulk feed in the metering chamber 26. The end of the semicylindrical member 21 adjacent the end plate 17 is formed with an opening 68 above the metering chamber 26. A resilient diaphragm 69 covers the opening 68 and is secured to the semicylindrical member by a housing 71 enclosing the switch 67. The switch 67 has an actuating finger 72 in engagement with a flexible diaphragm 69.

The doors 27 of the respective units 12a to 12z are moved simultaneously to an open and closed position so that the bulk feed in the metering chamber 26 of the respective units is simultaneously discharged into the respective corresponding pens 11. Each door 27 has a downwardly extended angle lip 74. A longitudinally extended rod 76 positioned adjacent the lip 74 of the respective doors 27 is secured to each lip 74 by a downwardly extended pin 77. A set screw 75 is threaded into the end of the pin 77 and engages the rod 76 to secure the rod to the respective doors. The doors 27 are biased to a closed position by a tension spring 78 connected to the rear end of the rod 76 by means of a cable 79. A pulley 81 pivotally mounted on the frame 73 below the motor 61 guides the cable 79 in alignment with the spring 78. As shown in FIG. 4, a tubular housing 82 is secured to the sides of the last unit 12z and forms a casing for the spring 78. The spring 78 is connected to the tubular member 82 by means of a pin 83 which extends through holes 84 in the tubular member 82. The tension of the spring 78 is adjusted by changing the position of the pin 83 in the longitudinal holes 84.

The doors 27 of the respective units 12a to 12z are simultaneously moved to an open position by the action of a motor means 86 mounted on a frame 87 below the feeder hopper 53. The motor means 86 is a commercial unit which includes a speed reduction gear head and is manufactured as Model 4K795 by Dayton Electric Manufacturing Company of Chicago, Illinois. The motor means 86 has a capstan 88 upon which a cable 89 extends around in a driving relation with the peripheral surface of the capstan. One end of the cable 89 is secured to the pin 77 on the door 27 of the first unit. The other end of the cable 86 is secured to a weight 91 which maintains the cable in engagement with the capstan 88. Energization of the motor means 86 rotates the capstan 88 to pull the cable 89 and rod 76 toward the motor means 86 against the force of the spring 78 thereby simultaneously opening the doors 27 of the respective units 12a to 12z. When the door 27 of the first unit 12a engages a microswitch 92 fastened to the side wall 16 in the path of the moving door 27 the motor means 86 is de-energized whereupon the force of the tension spring 78 moves all the door 27 back to their closed position.

The electrical circuit for automatically coordinating the operation of the feeding system is shown in FIG. 7. A pair of solenoid operated switches 93 and 94 connected to a 110-v. power source by lines 96 and 97 are operable to connect the electric motor 61 and motor means 86 to the power source. The switches 93 and 94 are commercial units manufactured as Model 41DA30AF by the Furnace Electric Company of Batavia, Illinois. Lines 98 and 99 connect the switch 93 with the motor 61. Lines 101 and 102 connect the switch 94 with the motor means 86.

A feeding program timer 103 is connected to the switch 93 by lines 104 and the control micro-switch 67 by line 106. The switch 67 is normally closed to connect the line 106 to the solenoid control 107 of the switch 93 by means of a line 108. The timer 103 is programmed to periodically close the circuit for energizing the solenoid 107 which actuates the switch 93 to connect the power source to the lines 98 and 99 thereby operating the electric motor 61. In the event that the electric motor 61 is overloaded for a prolonged period of time a bi-metal overload relay 109 is opened to break the circuit of the solenoid control 107 with the resultant opening of the switch 93.

The electric motor 61 operates to drive the auger assembly 56 to carry the bulk feed to the respective units 12a to 12z of the feeding system 10. When all of the units are filled with feed, the feed in the last unit 12z will apply a pressure on the diaphragm 69 to raise the control finger 72 actuating the switch 67 to open the circuit for the solenoid 107 of the switch 93. This will open the switch 93 breaking the circuit to the electric motor 61. When the control finger 72 of the switch 67 is in its "on" position, as indicated by the broken line, the line 106 is connected to the solenoid 111 of the switch 94 by means of lines 112 and 113. On energization of the solenoid 111 the switch 94 is closed thereby connecting the power source to the motor means 86. The motor means 86 pulls the doors 27 by means of the cable 89 and capstan drive 88 into engagement with the normally closed micro-switch 92 interposed in the lines 112 and 113. When the door 27 of the unit 12a contacts the micro-switch 92 the circuit for the solenoid 111 is broken thereby opening the circuit to the motor means 86. When the door 27 of the unit 12z is in the open position the pressure of the bulk feed on the flexible diaphragm 69 is removed and the switch 67 returned to its normal position connecting the lines 106 and 108. This connection does not energize the solenoid 107 as the timer 103 has opened the circuit to the solenoid 107. A bi-metal overload relay 114 is placed in the circuits for the control 111 and the motor means 86 and is operative to open the circuit to the solenoid 111 when there is a prolonged overload of the motor means 86. The bi-metal overload relays 109 and 114 are commercial units manufactured as Model 41DA17A-A4 by Furnace Electric Company, Batavia, Illinois.

In use, each partition 32 of the several units 12 in the feeding system is adjusted to vary the volume of the metering chamber 26 in accordance with the amount of feed desired to be discharged onto the feed floors of the individual pens 11. The partition 32 of each unit 12 is released from locking engagement with the angle members 36 and 37 by releasing the nut and bolt assembly 49 thereby permitting the partition 32 to be moved into a desired position as indicated by the relative position of the pointer 46 with respect to the indicia on the scale 44 which is precalibrated in accordance with the weight of a specific volume of feed. The partition 32 is clamped in this position by turning the wing nut of the nut and bolt assembly 49 to move the bar 48 in engagement with the angle members 36 and 37. The partition 32 is adjustable from a fully closed position wherein it engages the end plate 17 to a fully open position as indicated by the dotted vertical line 115.

In operation, the timer 103 is manually set to periodically energize the solenoid 107 of the switch 93 thereby connecting the electric motor 61 to the 110 v. power source. The electric motor 61, through the power transmitting assembly 62, rotates the auger assembly 56 whereby bulk feed from the hopper 53 is moved through the opening 54 and into the metering chambers 26 of the respective units 12. The metering chambers 26 are successively filled with bulk feed carried by the flight 57 of the auger assembly 56. The unit 12z adjacent the motor 61 is thus the last unit to be filled with feed. When this unit is full of feed the auger assembly 56 will force the feed into the opening 68 and against the resilient diaphragm 69 to move the control finger of the micro-switch 67 to break the circuit of the solenoid 107 and open the circuit to the electric motor 61 whereby to stop the rotation of the auger assembly 56.

When the control finger 72 of the micro-switch 67 has been moved to its position to de-energize the solenoid 107 the circuit for the solenoid 111 of the switch 94 is closed thereby energizing solenoid 111 and closing the switch 94 to connect the 110 v. power source with the motor means 86. Energization of the motor means 86 rotates the capstan 88 which applies a pulling force on the cable 89 with the resultant simultaneous opening of the doors 27 of all the units 12a to 12z. With the doors 27 in the open position the bulk feed in the metering chambers 26 falls onto the feed floor of the respective pens 11. The doors 27 are moved to the open position against the force of the tension spring 78 which is connected to the rod 76 by a cable 79 extended over a pulley 81. When the door 27 of the first unit 12a moves to the open position it engages and opens the normally closed micro-switch 92 thereby opening the circuit to the solenoid 111 of the switch 94. When the solenoid 111 is de-energized the switch 94 moves to its open position thereby breaking the circuit to the motor means 86. With the motor means 86 turned off the biasing force of the tension spring 78 pulls all of the doors 27 back to their closed position as shown in FIG. 3. The metering chambers 26 are empty and the doors 27 of all the units are in the closed position. Upon a subsequent operation of the timer 103 the feeding system will go through a second cycle of operation.

In summary the feeding system 10 has individual metering and dispensing units each of which contains an adjustable partition 32 for controlling the amount of bulk feed discharged from the respective units. The metering chambers 26 are automatically filled by a common conveyor 13. When all of the metering chambers 26 are filled the bulk feed in the last chamber will apply a pressure to actuate the micro-switch 67 to terminate the operation of the conveyor 13 and simultaneously energize the motor means 86 for simultaneously opening all of the doors 27 to discharge the bulk feed in all of the metering chambers 26 onto the feed floor of the respective pens 11. After the bulk material in the metering chambers has been discharged the doors 27 are automatically closed by the action of the tension spring 78 to place the feeding system in a condition to perform a second cycle of operation.

While there have been shown, described, and pointed out the fundamental novel features of the invention as applied to the preferred embodiment, it is to be understood that various omissions, substitutions, changes in form, and details of the feeding system illustrated may be made by those skilled in the art, without departing from the spirit of the invention. It is intended to be limited only as indicated by the scope of the following claims.

I claim:
1. A feeding system for periodically and simultaneously supplying feed to a plurality of separate feeding locations comprising:
   (a) means for storing a supply of feed,
   (b) feed dispensing units corresponding in number to the number of feeding locations and supported at a higher elevation than said feeding locations, each unit including a housing defining a feed metering chamber,
   (c) door means mounted on said housing of each unit for movement to first and second positions for opening and closing the bottom of said metering chamber,
   (d) conveyor means including a motor, said conveyor means connecting the units in series and operable to move feed from said feed storing means to sequentially fill the metering chamber of the respective units,
   (e) means including a motor for simultaneously moving said door means to the first position thereby opening the bottom of said metering chambers discharging feed to the feeding locations,
   (f) switch means actuated in response to feed moved into the last unit to disconnect said conveyor means motor from and connect said door motor to a source of energy whereby said conveyor means is rendered inoperative and said door means are moved to the first position, and
   (g) means for moving said door means from the first to the second position thereby closing the bottom of said metering chambers.

2. A feeding system for periodically and simultaneously supplying feed to a plurality of separate feeding locations comprising:
   (a) means for storing a supply of feed,
   (b) feed dispensing units corresponding in number to the number of feeding locations and supported at a higher elevation than said feeding locations, each unit including a housing defining a feed metering chamber,
   (c) door means mounted on said housing of each unit for movement to first and second positions for opening and closing the bottom of said metering chamber,
   (d) conveyer means connecting the units in series and operable to move feed from said feed storing means to sequentially fill the metering chambers of the respective units,
   (e) means for simultaneously moving said door means to the first position thereby opening the bottom of said metering chambers discharging feed to the feeding locations,
   (f) control means actuated in response to feed moved by said conveyer means to render inoperative said conveyer means and actuate said means for moving the door means to the first position, and
   (g) means for moving said door means from the first to the second position thereby closing the bottom of said metering chambers.

3. The feeding system defined in claim 2 wherein:
   (a) said conveyer means comprising an auger assembly extended through the feed storing means and sequentially through each feed dispensing unit,
   (b) said auger assembly having means for limiting the rate of flow of feed from the feed storing means.

4. The feeding system defined in claim 2 wherein each of said feed dispensing units comprises:
   (a) housing means having side walls and at least one end wall,
   (b) partition means slidably disposed in said housing means and forming with said sidewalls and end wall a feed metering chamber, and
   (c) means for adjustably positioning the partition means in said housing means with respect to said end wall to vary the size of said feed metering chamber.

5. A feeding system for periodically and simultaneously supplying feed to a plurality of separate feeding locations comprising:
(a) means for storing a supply of feed,
(b) feed dispensing units corresponding in number to the number of feeding locations and supported above said feeding locations,
(c) each of said units having housing means defining a feed metering chamber and movable partition means for changing the size of said metering chamber,
(d) door means movably mounted on said housing means to open and close the bottom of said metering chamber,
(e) conveyer means common to said units for moving feed from said feed storing means into each of said feed metering chambers,
(f) motor means operably connected to each door means for moving the door means to the open position,
(g) spring means for biasing each door means to the closed position, and
(h) switch means actuated in response to feed moved into the last unit to connect said motor means to a source of energy whereby said door means are simultaneously moved to an open position to supply the feed to the feeding locations.

6. A feeding system for periodically and simultaneously supplying feed to a plurality of separate feeding locations comprising:
(a) means for storing a supply of feed,
(b) feed dispensing units corresponding in number to the number of feeding locations and supported at a higher elevation than said feeding locations, each unit including a housing defining a feed metering chamber,
(c) door means mounted on said housing of each unit for movement to first and second positions for opening and closing the bottom of said metering chamber,
(d) conveyer means connecting the units in series and operable to move feed from said feed storing means to sequentially fill the metering chambers of the respective units,
(e) means for simultaneously moving said door means to the first position thereby opening the bottom of said metering chambers to discharge feed to the feeding locations,
(f) control means for rendering inoperative said conveyer means when said feed metering chambers are filled with feed and for actuating said door moving means to move the door means to the first position, and
(g) means for moving said door means from the first to the second position to close the bottom of said metering chambers.

7. A feeding system for periodically supplying feed to a feeding location comprising:
(a) means for storing a supply of feed,
(b) a feed dispensing unit supported adjacent to and at a higher elevation than said feeding location, said unit including a housing defining a feed metering chamber,
(c) door means mounted on the housing of said unit for movement to first and second positions for opening and closing the bottom of said metering chamber,
(d) conveyer means connected to the unit to move feed from said feed storing means to fill the metering chamber of the unit,
(e) means for moving said door means to the first position thereby opening the bottom of said metering chamber to discharge feed to the feeding location,
(f) control means for rendering inoperative said conveyer means when said feed metering chamber is filled and for actuating said door moving means to move the door means to the first position, and
(g) means for moving said door means from the first to the second position to close the bottom of said metering chamber.

8. In a feeding system having a bulk material storing hopper connected to a tube through an opening between the hopper and tube:
(a) first auger means positioned in the hopper for feeding bulk material through the opening into the tube,
(b) second auger means positioned in the tube for carrying bulk material discharge by the first auger means through the tube, and
(c) means on said first auger means and positioned in the opening between the hopper and tube for restricting the flow capacity of the opening to a capacity below the feeding capacity of the first auger means whereby to circulate the bulk material in the hopper.

9. The structure defined in claim 8 wherein the means on the first auger means comprises:
(a) a disc carried by the first auger means and positioned in the center area of the opening.

10. In a feeding system,
(a) a feed storing hopper having a bottom wall and upright side walls, one of said side walls having an opening adjacent the bottom wall,
(b) a tubular member positioned adjacent said one side wall in alignment with the opening therein, and
(c) auger means operatively mounted on said hopper and tubular member, said auger means being extended through said opening and having a feeding capacity larger than the flow capacity of said opening whereby upon operation of the auger means the bulk material in the hopper is circulated and the bulk material supplied to the tubular member is less than the capacity of the tubular member.

References Cited by the Examiner
UNITED STATES PATENTS 1,337,440 4/20 Clappison.
1,392,311 10/21 Egeland _____ 119—51.11 X
2,525,225 10/50 Karlovich _____ 222—438

EVERETT W. KIRBY, Primary Examiner.
LOUIS J. DEMBO, Examiner.